(12) United States Patent
Stallings et al.

(10) Patent No.: US 9,832,326 B2
(45) Date of Patent: *Nov. 28, 2017

(54) CAMERA DATA MANAGEMENT AND USER INTERFACE APPARATUSES, SYSTEMS, AND METHODS

(71) Applicant: Verizon Patent and Licensing Inc., Arlington, VA (US)

(72) Inventors: Heath Stallings, Colleyville, TX (US); James Y. Hwang, Jersey City, NJ (US); Shadman Zafar, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/254,953

(22) Filed: Sep. 1, 2016

(65) Prior Publication Data

US 2016/0373595 A1 Dec. 22, 2016

Related U.S. Application Data

(60) Continuation of application No. 14/293,795, filed on Jun. 2, 2014, now Pat. No. 9,456,023, which is a
(Continued)

(51) Int. Cl.
*H04N 1/00* (2006.01)
*H04N 5/232* (2006.01)
(Continued)

(52) U.S. Cl.
CPC ......... *H04N 1/00159* (2013.01); *H04L 67/06* (2013.01); *H04N 1/0044* (2013.01);
(Continued)

(58) Field of Classification Search
CPC ... H04N 2201/0084; H04N 2201/0087; H04N 5/23293; H04N 5/23206; H04N 5/23222; H04N 1/00132; H04N 1/00442; H04N 1/00461; H04N 1/00413; H04N 1/00474; H04N 1/00458; H04N 1/32122; H04N 1/00159; H04N 1/00137; H04N 1/00427;
(Continued)

(56) References Cited

U.S. PATENT DOCUMENTS 5,806,005 A 9/1998 Hull et al.
6,249,316 B1 6/2001 Anderson
(Continued)

FOREIGN PATENT DOCUMENTS

CN 1233834 11/1999
EP 1191778 3/2002
(Continued)

*Primary Examiner* — Michael Osinski

(57) ABSTRACT

In certain embodiments, a mobile device having a digital camera captures a camera image, locally stores the camera image, automatically assigns the camera image to a session based on the camera image being captured during a particular time range, and provides, for display on a display screen of the mobile device, a session specific image manager pane together with a live camera sensor view in a graphical user interface, the session specific image manager pane including data representative of the camera image assigned to the session.

20 Claims, 15 Drawing Sheets

Related U.S. Application Data division of application No. 13/929,942, filed on Jun. 28, 2013, now Pat. No. 8,743,261, which is a continuation of application No. 12/165,411, filed on Jun. 30, 2008, now Pat. No. 8,477,228.

(51) Int. Cl.
*H04L 29/08* (2006.01)
*H04N 1/21* (2006.01)
*H04N 101/00* (2006.01)

(52) U.S. Cl.
CPC ..... *H04N 1/00132* (2013.01); *H04N 1/00137* (2013.01); *H04N 1/00307* (2013.01); *H04N 1/00413* (2013.01); *H04N 1/00427* (2013.01); *H04N 1/00442* (2013.01); *H04N 1/00453* (2013.01); *H04N 1/00461* (2013.01); *H04N 1/00472* (2013.01); *H04N 1/00474* (2013.01); *H04N 1/2166* (2013.01); *H04N 5/23216* (2013.01); *H04N 5/23293* (2013.01); *H04N 2101/00* (2013.01); *H04N 2201/0084* (2013.01)

(58) Field of Classification Search
CPC ............. H04N 1/0044; H04N 1/00453; H04N 1/00472; H04N 1/2166; H04N 5/23216; H04N 2101/00
See application file for complete search history.

(56) References Cited

U.S. PATENT DOCUMENTS

| | | | |
|---|---|---|---|
| 6,310,648 B1 | 10/2001 | Miller et al. | |
| 6,515,704 B1 | 2/2003 | Sato | |
| 6,538,698 B1 | 3/2003 | Anderson | |
| 6,629,104 B1 | 9/2003 | Parulski et al. | |
| 6,700,612 B1 | 3/2004 | Anderson et al. | |
| 6,914,625 B1 | 7/2005 | Anderson et al. | |
| 7,193,646 B1 | 3/2007 | Shioji | |
| 7,414,658 B2 | 8/2008 | Ariga | |
| 7,480,002 B2 | 1/2009 | Goh et al. | |
| 7,656,451 B2 | 2/2010 | Yanagi | |
| 7,657,568 B2 | 2/2010 | Shimosato | |
| 7,924,323 B2 | 4/2011 | Walker et al. | |
| 8,265,146 B2 * | 9/2012 | Nunomaki | G11B 27/105 375/240.12 |
| 8,392,850 B2 | 3/2013 | Nakagawa et al. | |
| 8,599,298 B2 * | 12/2013 | Sasaki | G06F 17/30274 348/333.05 |
| 9,641,761 B2 * | 5/2017 | Kim | H04N 1/00161 |
| 2001/0012062 A1 | 8/2001 | Anderson | |
| 2001/0030706 A1 | 10/2001 | Miller et al. | |
| 2002/0008765 A1 | 1/2002 | Ejima et al. | |
| 2002/0090910 A1 | 7/2002 | Takemura | |
| 2003/0007189 A1 | 1/2003 | Kusaka et al. | |
| 2003/0081135 A1 | 5/2003 | Boll | |
| 2003/0090574 A1 | 5/2003 | Seaman et al. | |
| 2003/0184653 A1 | 10/2003 | Ohkubo | |
| 2004/0119722 A1 | 6/2004 | Hilbert et al. | |
| 2004/0165085 A1 | 8/2004 | Shibutani | |
| 2004/0205286 A1 * | 10/2004 | Bryant | H04N 5/772 711/1 |
| 2004/0215786 A1 | 10/2004 | Ohnishi | |
| 2004/0267793 A1 * | 12/2004 | Sato | G11B 27/105 |
| 2005/0052548 A1 | 3/2005 | Delaney | |
| 2005/0206749 A1 | 9/2005 | Miyazaki | |
| 2005/0237391 A1 | 10/2005 | Shibuya et al. | |
| 2005/0266839 A1 | 12/2005 | Paul et al. | |
| 2006/0098111 A1 | 5/2006 | Goh et al. | |
| 2007/0013790 A1 | 1/2007 | Nakase | |
| 2007/0047950 A1 | 3/2007 | Asami et al. | |
| 2007/0110308 A1 | 5/2007 | Hwang et al. | |
| 2007/0236575 A1 | 10/2007 | Jokinen et al. | |
| 2007/0242138 A1 | 10/2007 | Manico et al. | |
| 2008/0043108 A1 | 2/2008 | Jung et al. | |
| 2008/0114726 A1 | 5/2008 | Keohane et al. | |
| 2008/0176547 A1 | 7/2008 | Paul et al. | |
| 2008/0225153 A1 | 9/2008 | Fagans | |
| 2008/0252593 A1 | 10/2008 | Fukuta | |
| 2009/0070820 A1 | 3/2009 | Li | |
| 2009/0115872 A1 | 5/2009 | Lazaridis | |
| 2011/0096196 A1 | 4/2011 | Lee | |

FOREIGN PATENT DOCUMENTS

| | | |
|---|---|---|
| EP | 1746819 | 1/2007 |
| WO | 99/03263 | 1/1999 |

* cited by examiner

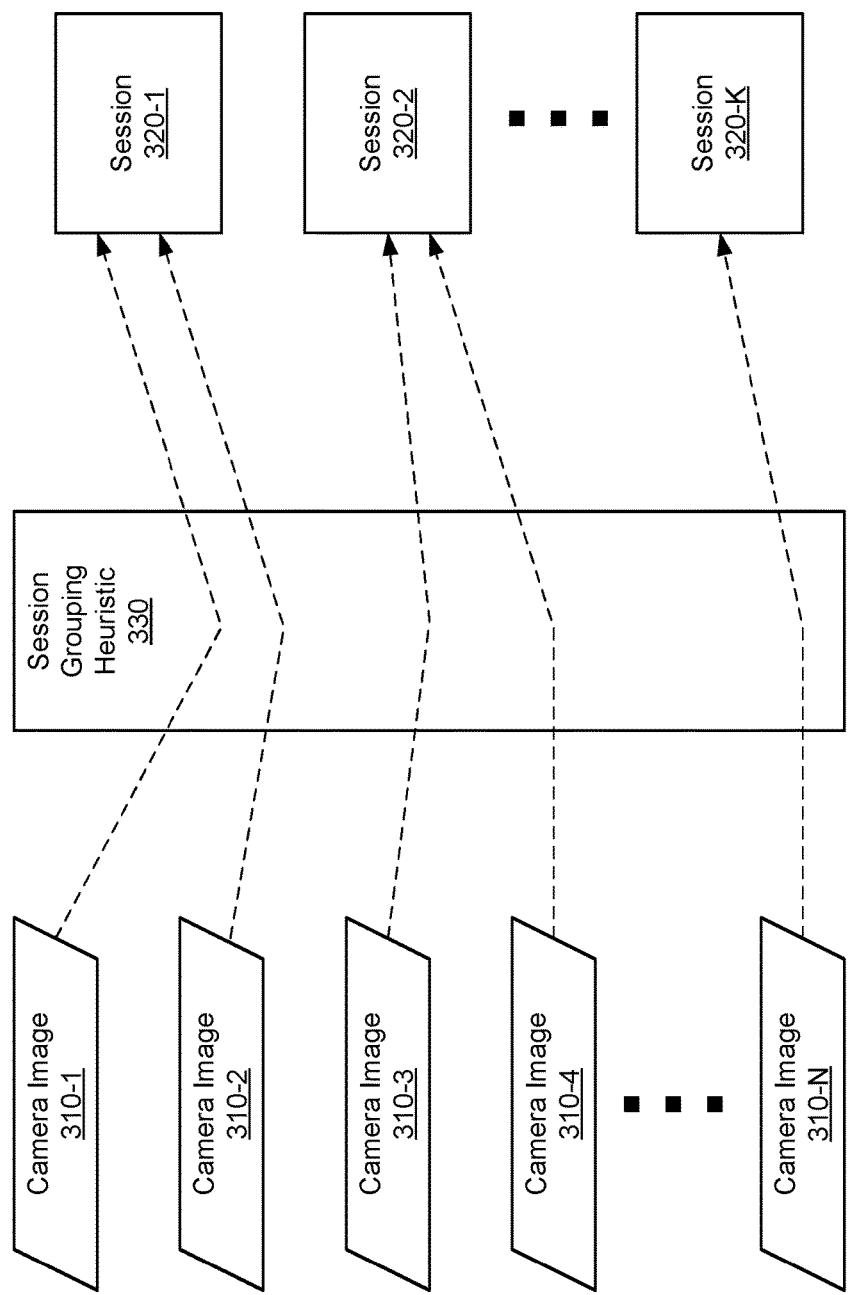

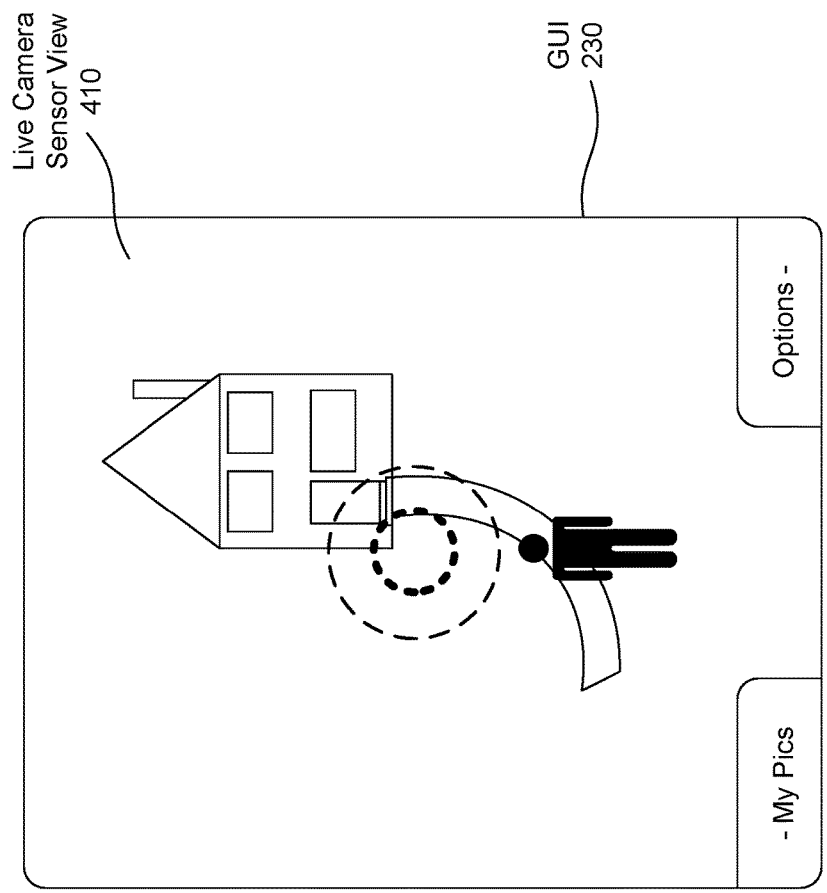

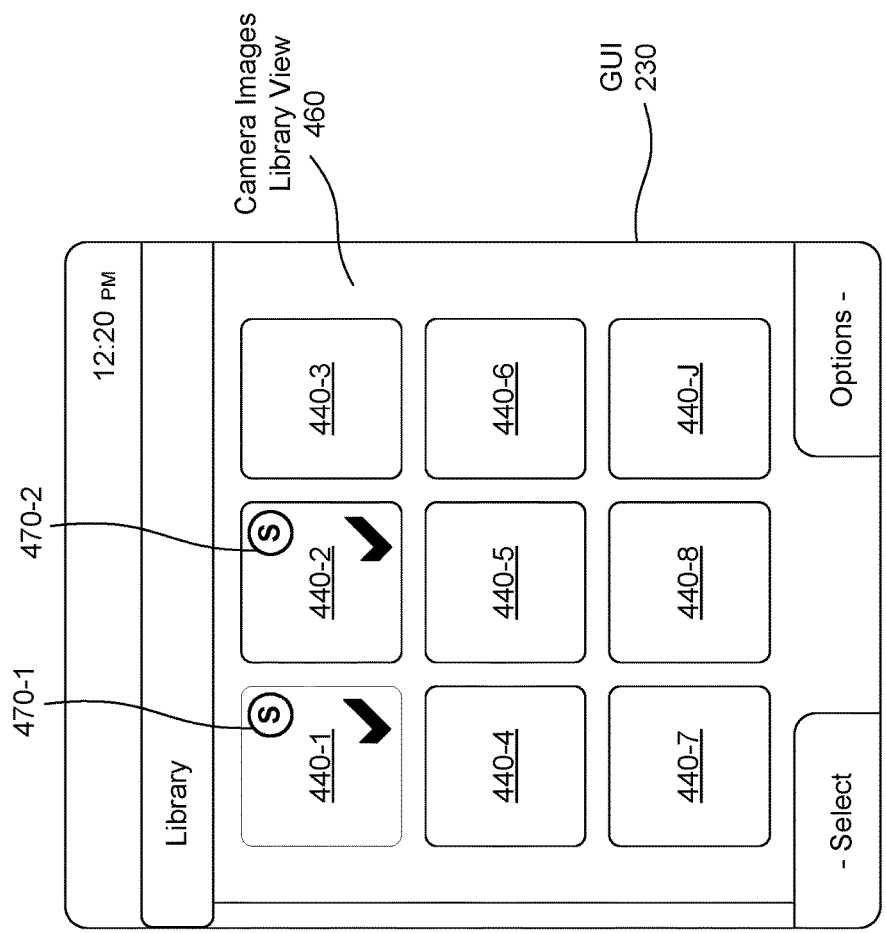

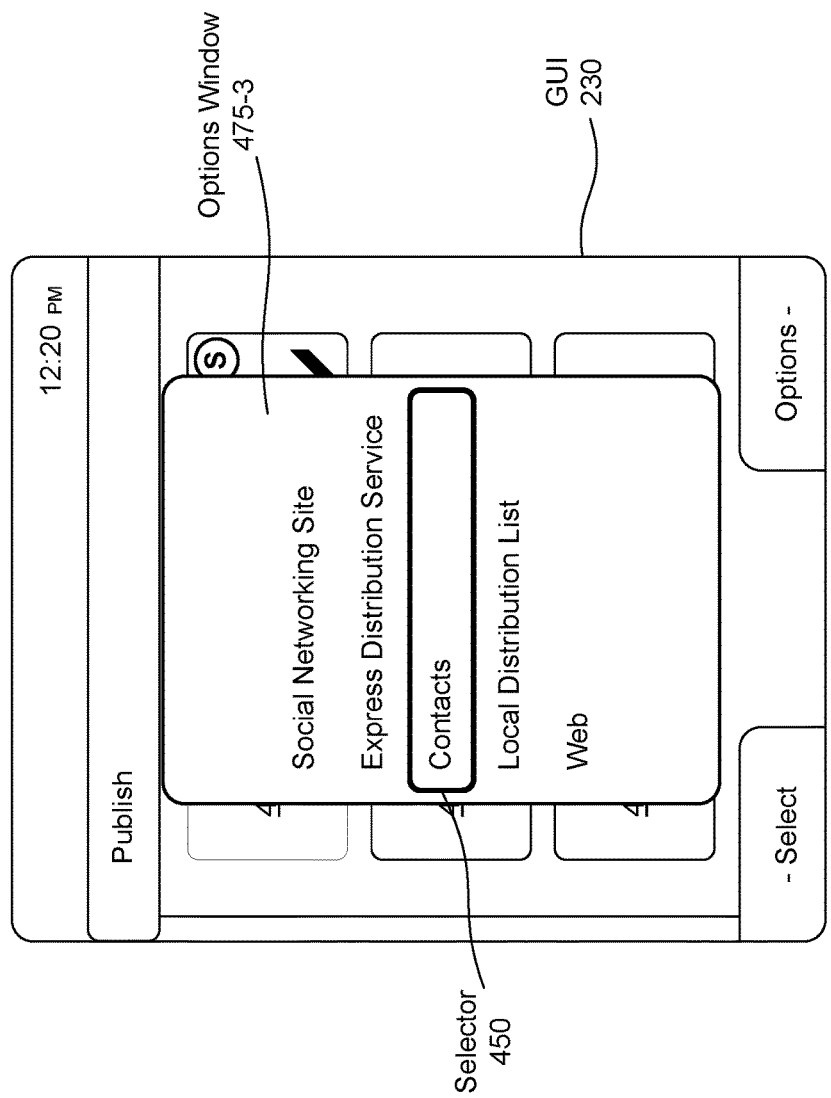

CAMERA DATA MANAGEMENT AND USER INTERFACE APPARATUSES, SYSTEMS, AND METHODS

RELATED APPLICATIONS

This application is a continuation application of U.S. patent application Ser. No. 14/293,795, filed on Jun. 2, 2014, which application is a divisional application of U.S. patent application Ser. No. 13/929,942, filed on Jun. 28, 2013 and issued on Jun. 3, 2014 as U.S. Pat. No. 8,743,261, which application is a continuation application of U.S. patent application Ser. No. 12/165,411, filed on Jun. 30, 2008 and issued on Jul. 2, 2013 as U.S. Pat. No. 8,477,228. The contents of these applications are incorporated herein by reference in their respective entireties.

BACKGROUND INFORMATION

As digital picture and data storage technologies have progressed, and as the costs associated with such technologies have declined, digital cameras have become commonplace in society. For example, a digital camera is included in many mobile phones. However, conventional data management and user interface applications provided with digital cameras, especially user interface applications provided with camera phones, tend to be un-intuitive and difficult to use.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3 illustrates an exemplary session-based organization of camera images.

FIGS. 4A-4I illustrate exemplary graphical user interface views that may be displayed.

DETAILED DESCRIPTION OF PREFERRED EMBODIMENTS

Exemplary camera data management and user interface apparatuses, systems, and methods are described herein.

In certain exemplary embodiments, a graphical user interface is provided for display. Various graphical user interface views may be displayed in the graphical user interface and may be configured to allow a user to interact with camera related features and functionality, as well as camera image data. In some examples, a graphical user interface including a live camera sensor view is displayed and, in response to a capture of a camera image, an image manager pane is displayed together with the live camera sensor view in the graphical user interface. The image manager pane includes a visual indicator representative of the captured camera image.

In certain exemplary embodiments, a camera image is captured and automatically assigned to a session based on a predefined session grouping heuristic. Such sessions may be defined and used to organize camera images and to groups for processing. Examples of sessions and assignment of camera images to sessions are described further below.

In certain exemplary embodiments, data representative of a captured camera image is provided to a content distribution subsystem over a network, and the content distribution subsystem is configured to distribute data representative of the camera image to a plurality of predefined destinations. In some examples, the destinations are defined by a user, and content distribution subsystem is configured to send the camera image to the defined destinations.

Exemplary embodiments of camera data management and user interface apparatuses, systems, and methods will now be described in more detail with reference to the accompanying drawings.

Figure 1:
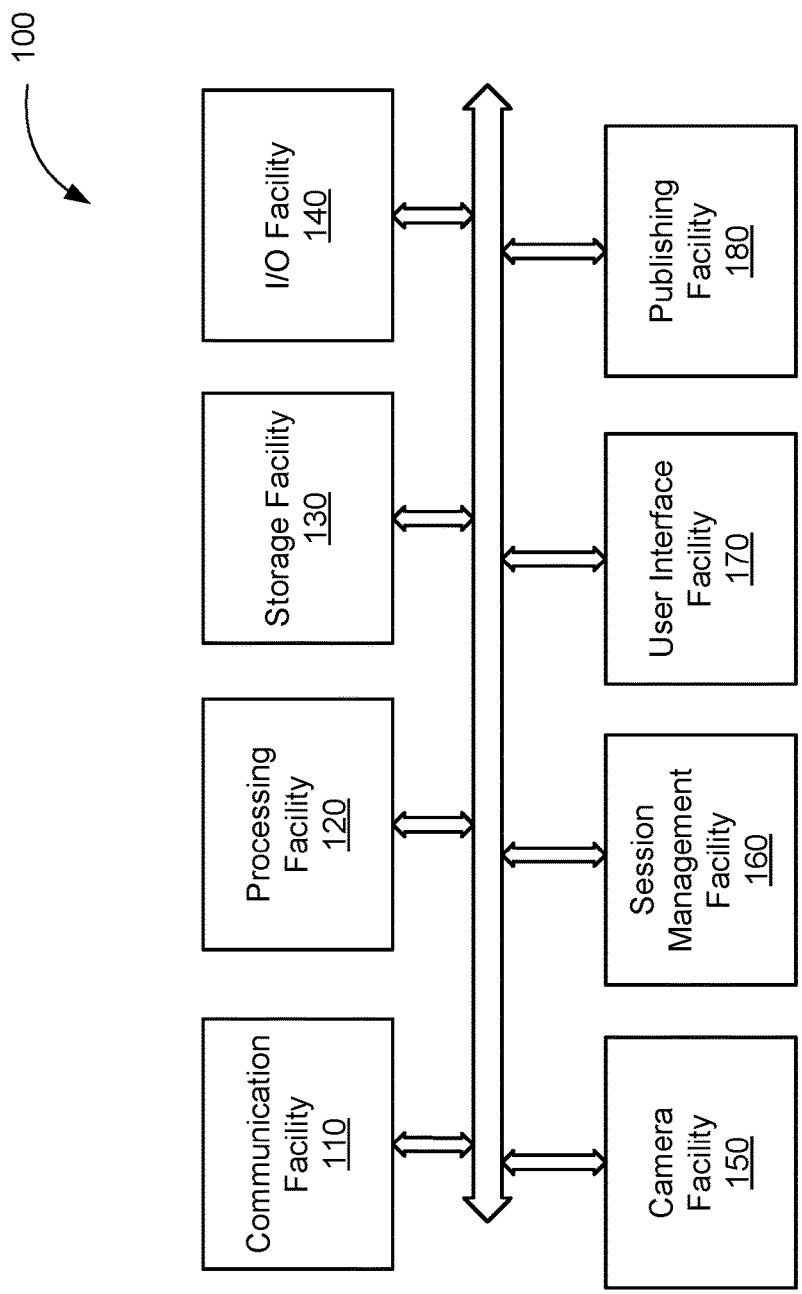
FIG. 1 illustrates an exemplary camera data management and user interface system.

FIG. 1 illustrates an exemplary camera data management and user interface system 100 (or simply "system 100"). As shown in FIG. 1, system 100 may include a communication facility 110, processing facility 120, storage facility 130, input/output ("I/O") facility 140, camera facility 150, session management facility 160, user interface facility 170, and publishing facility 180 communicatively connected to one another. The facilities 110-180 may be communicatively connected using any suitable technologies and may communicate using any communication platforms and/or technologies suitable for transporting communications and data between the facilities 110-180, including well known communication platforms and technologies.

In some examples, system 100 may include any computing hardware and/or instructions (e.g., software programs), or combinations of computing instructions and hardware, configured to perform the processes described herein. In particular, it should be understood that system 100 or components of system 100 may be implemented on one physical computing device or may be implemented on more than one physical computing device. Accordingly, system 100 may include any one of a number of well known computing devices, and may employ any of a number of well known computer operating systems.

One or more of the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computing device can read.

Accordingly, each of the facilities 110-180 may be implemented as hardware, computing instructions (e.g., software) tangibly embodied on a computer-readable medium, or a combination of hardware and tangibly embodied computing instructions configured to perform one or more of the processes described herein. In certain embodiments, for example, session management facility 160, user interface facility 170, and/or one or more other facilities may be implemented as one or more software applications embodied on a computer-readable medium such as storage facility 130 or other memory and configured to direct processing facility 120 to execute one or more of the processes described herein.

The components of system 100 shown in FIG. 1 are illustrative only. Other embodiments may add, omit, or reconfigure one or more components. In certain embodiments, for example, communication facility 110 and/or publishing facility 180 may be omitted. In certain embodiments, session management facility 160 or user interface facility 170 may be omitted. Each of the facilities 110-180 will now be described in more detail.

Communication facility 110 may be configured to send and/or receive communications to/from one or more external devices (e.g., a server). Communication facility 110 may include and/or employ any device, logic, communication media, communication protocols, and/or other technologies suitable for transmitting and receiving communications and data, including data representative of camera images (e.g., photos) and/or publishing commands and data. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, and other suitable communications networks and technologies.

Processing facility 120 may include one or more processors and may be configured to execute and/or direct execution of one or more processes or operations described herein. Processing facility 120 may direct execution of operations in accordance with computer-executable instructions such as may be stored in storage facility 130 or another computer-readable medium. As an example, processing facility 120 may be configured to process data, including demodulating, decoding, and parsing acquired data, and encoding and modulating data for transmission by communication facility 110.

Storage facility 130 may include one or more data storage media, devices, or configurations and may employ any type, form, and combination of storage media. For example, the storage facility 130 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data, including data representative of camera images and/or image metadata, may be temporarily and/or permanently stored in the storage facility 130.

I/O facility 140 may be configured to receive user input and provide user output and may include any hardware, firmware, software, or combination thereof supportive of input and output capabilities. For example, I/O facility 140 may include one or more devices for capturing user input, including, but not limited to, a microphone, speech recognition technologies, keyboard or keypad, touch screen component, receiver (e.g., an RF or infrared receiver), and one or more input buttons.

I/O facility 140 may include one or more devices for presenting output to a user, including, but not limited to, a graphics engine, a display (e.g., a display screen), one or more display drivers, one or more audio speakers, and one or more audio drivers. Output may include audio, visual, textual, and/or haptic output. In certain embodiments, for example, I/O facility 140 is configured to display a graphical user interface ("GUI") for viewing by a user. Exemplary GUIs that may be displayed by I/O facility 140 are described further below.

Camera facility 150 may include any combination of hardware, software, and/or firmware configured to capture camera images. For example, camera facility 150 may include a still-shot camera, video camera, and/or components of a camera such as a camera lens, camera sensor, etc. Any suitable camera technologies and devices may be employed. Accordingly, camera facility 150 may capture one or more camera images, including generating data representative of the camera images (e.g., digital image data). Data representative of captured images may be provided to one or more other facilities 110-140 and 160-180 for processing and/or storage. For example, camera image data may be temporarily or permanently stored in storage facility 130. A camera image may include one or more images and/or data representative of one or more images captured by camera facility 150, including, but not limited to, a photograph, video, or other collection of image frames.

Session management facility 160 may be configured to organize, or direct processing facility 120 to organize, camera images and/or related data by session based on a predefined session grouping heuristic. Session management facility 160 may also provide one or more tools for defining session grouping criteria. Exemplary definitions of session grouping criteria and session-based organization of camera images are described further below.

User interface facility 170 may be configured to generate, or direct processing facility 120 to generate, one or more user interfaces. For example, one or more GUIs may be generated and provided to I/O facility 140 for display. As mentioned, exemplary GUI views are described further below.

Publishing facility 180 may be configured to execute, or direct execution of, one or more operations for publishing camera images. Publishing may include, but is not limited to, providing one or more camera images to I/O facility 140 for display, to communication facility 110 for transmission to an external device or devices for storage and/or distribution (e.g., automated predefined distribution), and/or to an external service or platform (e.g., a social networking website) for display. Examples of publishing camera images are described further below.

Figure 2:
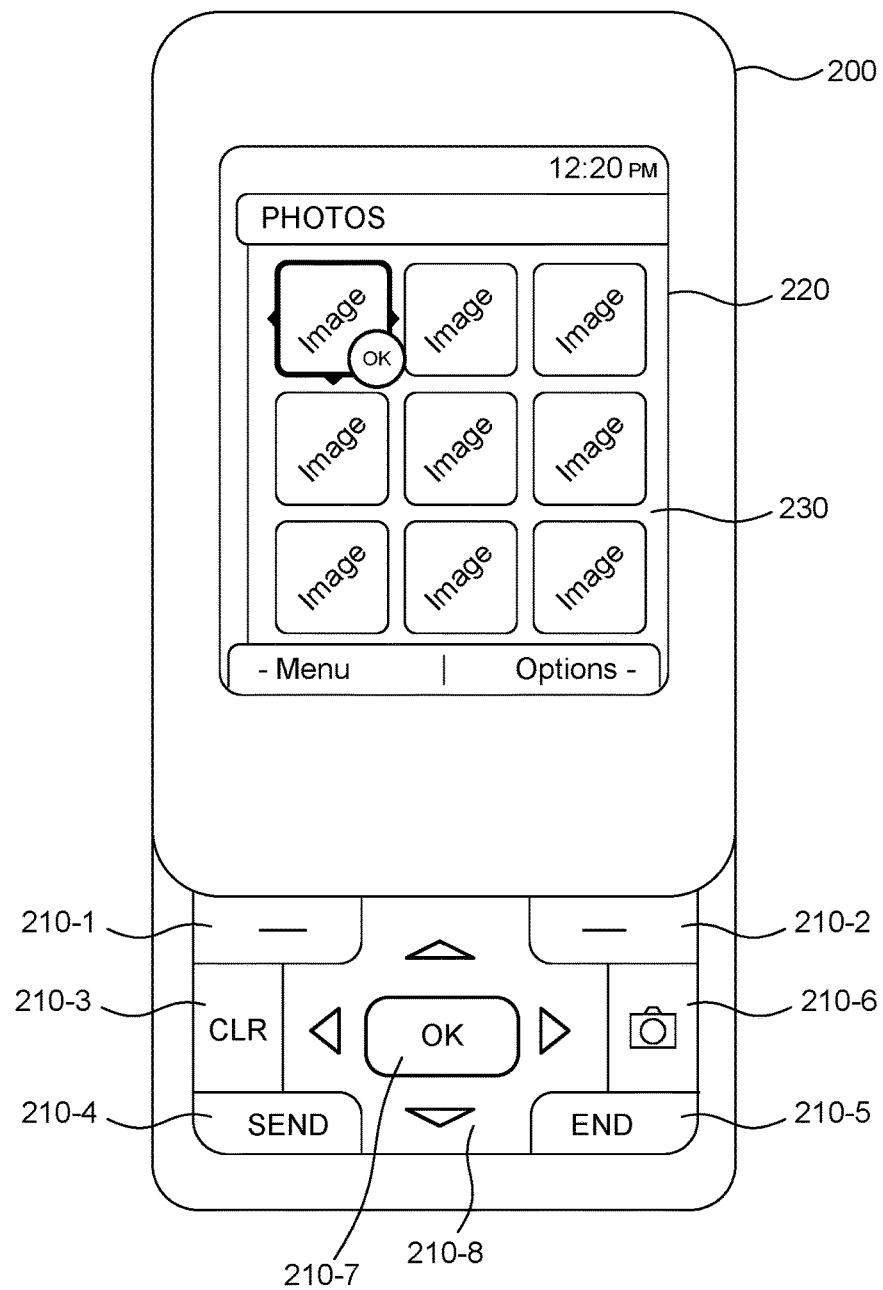
FIG. 2 illustrates an exemplary mobile device having the system of FIG. 1 implemented therein.

System 100 may be implemented in a variety of ways and as may suit a particular application. FIG. 2 illustrates an exemplary mobile device 200 having system 100 implemented thereon. Mobile device 200 may include one or more of the facilities 110-180 shown in FIG. 1 and may be configured to perform one or more of the processes and/or operations described herein. In certain embodiments, mobile device 200 comprises a mobile phone device having a built-in digital camera. System 100 may be implemented in other devices or types of devices in other embodiments.

As shown in FIG. 2, mobile device 200 may include a plurality of input buttons 210-1 through 210-8 (collectively "input buttons 210"), which may be actuated by a user to provide input to the mobile device 200. Exemplary input buttons may include "soft" and/or "hard" coded input buttons. "Soft" coded buttons may be dynamically associated with different user input commands and/or operations based on the context of operations of the mobile device 200, and "hard" coded buttons may be statically associated with corresponding user input commands and/or operations of the mobile device 200. FIG. 2 illustrates mobile device 200 including "soft" input buttons 210-1 and 210-2. Operations associated with "soft" input buttons 210-1 and 210-2 may be indicated to a user. FIG. 2 shows a visually indicated "Menu" operation and "Options" operation as being associated with "soft" input buttons 210-1 and 210-2, respectively. Mobile device 200 further includes a "clear" ("CLR") input button 210-3, a "SEND" input button 210-4, an "END" input button 210-5, a camera mode input button 210-6, a selector button 210-7, and one or more directional (e.g., "up", "down," "left," and "right") input buttons 210-8.

A user of mobile device 200 may utilize one or more of the input buttons 210 to provide user input configured to initiate mobile device operations. For example, camera mode input button 210-6 may be actuated to activate or terminate operation of a camera mode on mobile device 200. When the camera mode is active, camera facility 150 may operate in a state configured for capturing camera images. As another example, directional input buttons 210-8 may be used to navigate a visual selector within a GUI and highlight or otherwise indicate specific selectable items in the GUI. Selector button 210-7 may be used to select one or more highlighted items and thereby activate one or more operations associated with the selected item(s).

As shown in FIG. 2, mobile device 200 may include a display 220 configured to display a graphical user interface 230 ("GUI 230") for viewing by a user of mobile device 200. Display 220 may be included in I/O facility 140 and may include a display screen on which GUI 230 may be displayed. Examples of GUI 230 and various views that may be displayed in GUI 230 are described in detail further below.

To help facilitate an understanding of session management facility 160 and session management operations, FIG. 3 illustrates an exemplary organization of camera images by session. Camera facility 150 may acquire camera images 310-1 through 310-N (collectively "camera images 310"), and session management facility 160 may organize the acquired camera images 310, including selectively organizing the camera images 310 into one or more sessions 320-1 through 320-K (collectively "sessions 320"). In certain embodiments, camera images 310 may be automatically assigned to one or more sessions 320 as the camera images 310 are acquired (e.g., as photos are captured).

A session 320 may include a defined grouping of one or more camera images 310. A session may be defined as may serve a particular implementation or application of system 100. In certain embodiments, a session 320 may be defined by specifying one or more criteria to be satisfied to qualify a camera image 310 for inclusion in the session 320. When a camera image 310 is determined to satisfy the criteria, the camera image 310 may be assigned to the session 320.

As an example, a session 320 may be defined as a grouping of one or more camera images acquired within a continuous time period during which a camera mode is active (i.e., camera facility 150 is in a state configured to acquire camera images). Activation of the camera mode may be a defined criterion for creating a new session 320, and deactivation of the camera mode may be a defined criterion for closing the session. Accordingly, when a user activates a camera mode, session management facility 160 may create a new session 320-1. Any camera images 310-1 and 310-2 acquired between the time that the camera mode is activated (and session 320-1 is created) and the time that the camera mode is deactivated (and session 320-1 is closed) may be assigned to the session 320-1. This process may be repeated for other camera images acquired during a period of time between another activation and deactivation of camera mode. Camera facility 150 may be configured to activate or deactivate camera mode in response to predetermined events, such as a user turning camera mode on or off (e.g., using "camera mode" button 210-6) or expiration of a predefined length of time since the most recent camera image is acquired.

As another example, a session 320 may be defined based on geographic criteria. For example, a session 320 may be defined to include grouping criteria specifying a common geographic location (e.g., a particular geographic position or area). Accordingly, camera images 310 associated with the geographic location may be assigned to the session 320. For instance, mobile device 200 may be configured to detect the geographic location of the mobile device 200, such as by using GPS technologies to determine GPS coordinates for the detected location of the mobile device 200. When a camera image 310 is acquired, location data representative of the geographic location of the mobile device 200 may be associated with the camera image 310. For example, the location data may be included in camera image metadata. Session management facility 160 may be configured to use the location data to selectively assign the camera image 310 to the session 320 that has been defined by geographic location as described above. Accordingly, camera images 310 associated with a particular geographic location (e.g., camera images 310 acquired within the geographic location) may be grouped into a session 320.

As yet another example, a session 320 may be defined based on time data. For example, a session 320 may be defined to include camera images 310 associated with (e.g., captured within) a particular time range (e.g., a day, week, month, etc.). Accordingly, camera images 310 may be selectively assigned to sessions 320 based on time data associated with the camera images 310, such as time data indicating when camera images 310 are acquired.

Combinations of various session grouping criteria, including any combination or sub-combination of the above-described examples of session grouping criteria, may be used to define a session 320.

In certain embodiments, session management facility 160 may be configured to automatically and selectively assign acquired camera images 310 to one or more sessions 320 based on a predefined session grouping heuristic 330. The session grouping heuristic 330 may be defined to represent one or more defined session grouping criteria associated with one or more sessions 320. Accordingly, the session grouping heuristic 330 may include a set of rules configured to be used by the session management facility 160 to automatically and selectively assign acquired camera images 310 to sessions 320.

Session management facility 160 may provide one or more tools configured to enable a user (e.g., a user of mobile device 200) to manage sessions 320, including defining, creating, opening, modifying, closing, deleting, naming, searching, accessing, and otherwise processing sessions 320 or camera images 310 assigned to sessions 320. With the tools, a user of mobile device 200 may custom define one or more session grouping criteria to be satisfied to qualify a camera image 310 to be assigned to a session 320. Session management facility 160 may define and/or update the session grouping heuristic 330 to represent the user-defined criteria. Accordingly, a user may create custom session grouping criteria and sessions 320.

In certain embodiments, one or more of the tools provided by session management facility 160 may be configured to enable a user to assign identifiers (e.g., names) to sessions 320. For example, a session 320 defined to include camera images 310 associated with a particular geographic location may be descriptively named. Examples of such session names may include "home," "work," "lake," "road trip," etc. Session management facility 160 may further provide one or more tools for searching for and selecting sessions 320.

Camera images 310 included in a session 320 may be collectively displayed, identified, selected, and/or processed. As described further below, user interfaces may display camera images 310 organized by session 320, or user interfaces may provide an indication of a session 320 to which one or more camera images 310 are assigned. A session 320 may be selected and the camera images 310 included in the session 320 may be collectively selected and processed. For example, a session 320 may be selected and published, meaning that the camera images 310 within the session 320 are selected and published. Examples of publishing are described further below. Examples of session-based user interface views, session indicators in user interface views, and session-based operations are described further below.

To help facilitate an understanding of user interface facility 170 and an exemplary user interface provided by user interface facility 170, FIGS. 4A-4I illustrate exemplary GUI views that may be generated and provided by user interface facility 170 for display.

FIG. 4A illustrates GUI 230 having a live camera sensor view 410 displayed therein. Live camera sensor view 410 may be displayed in GUI 230 when camera facility 150 is operating in an active camera mode as described above. Live camera sensor view 410 may be a real time or near real time representation of a view as detected by a camera sensor.

A camera image (e.g., camera image 310-1) representative of the live camera sensor view 410 may be captured by camera facility 150. For example, a user of mobile device 200 may actuate selector button 210-7 or other input mechanism, and camera facility 150 may responsively capture a camera image 310-1 representative of the live camera sensor view 410.

Figure 4B:
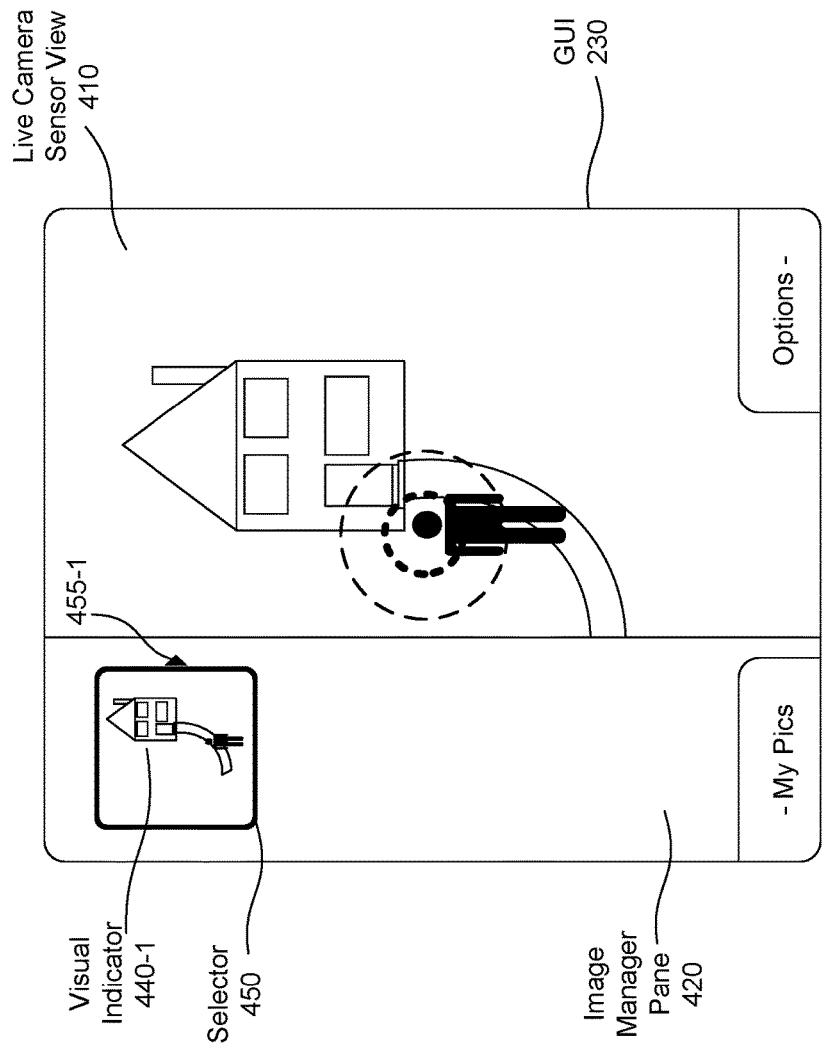

When a camera image 310-1 is captured, the view shown in FIG. 4A may be updated. For example, FIG. 4B illustrates GUI 230 having an image manager pane 420 and live camera sensor view 410 displayed together therein. In the view shown in FIG. 4B, live camera sensor view 410 may be as described above and may continue to display a real time or near real time representation of a view detected by a camera sensor. In the illustrated example, the image manager pane 420 is displayed as an overlay of the live camera sensor view 410 of FIG. 4A. This is illustrative only. In other embodiments, the live camera sensor view 410 of FIG. 4A may be resized, e.g., adjusted from a full-screen view to a partial screen view, to accommodate the image manager pane 420 in GUI 230.

While FIG. 4B illustrates a vertically oriented image manager pane 420 positioned along the left side of the live camera sensor view 410 and aligned with the left edge of the GUI 230, this is illustrative only. Other positions, shapes, orientations, and sizes of image manager panes 420 may be used in other embodiments. For example, an image manager pane 420 may be horizontally oriented and located along a top or bottom edge of GUI 230. As another example, image manager pane 420 may be configured to form a border, or a partial border, about the live camera sensor view 410 and/or the GUI 230.

Image manager pane 420 may be displayed in GUI 230 in response to capture of a camera image 310-1 or in response to another predetermined event (e.g., a predetermined user input command). In certain embodiments, user interface facility 170 may be configured to continue display of the image manager pane 420 in GUI 230 until an occurrence of a predetermined event, such as expiration of a predetermined length of time after capture of camera image 310-1 or deactivation of camera mode. For example, image manager pane 420 may be temporarily displayed when camera image 310-1 is captured and then hid from view after expiration of a predetermined length of time. When the image manager pane 420 is hid, the view in GUI 230 may return to a full screen live camera sensor view 410 as illustrated in FIG. 4A. In other embodiments, image manager pane 420 may be continued to be displayed in GUI 230 after camera image 310-1 is captured and an associated session remains active.

Image manager pane 420 may include one or more visual indicators representative of one or more camera images 310. In FIG. 4B, for example, image manager pane 420 includes visual indicator 440-1, which is representative of a camera image 310-1 captured from the live camera sensor view 410. Any suitable visual indicator may be employed. In certain embodiments, visual indicator 440-1 comprises a thumbnail image of the captured camera image 310-1.

In certain embodiments, visual indicator 440-1 may comprise a selectable object. FIG. 4B illustrates a selector 450 positioned at (e.g., highlighting) visual indicator 440-1. A user of mobile device 200 may provide input to navigate selector 450 within image manager pane 420 and highlight and/or select visual indicator 440-1.

One or more operations may be performed on a camera image 310-1 associated with a selected visual indicator 440-1 displayed in image manager pane 420. For example, with visual indicator 440-1 identified by selector 450, an options button (e.g., "soft" button 210-2) may be actuated. In response, user interface facility 170 may provide a set of selectable operations that may be applied to the camera image 310-1. Examples of such operations include, but are not limited to, deleting, permanently storing, naming, appending a note to, and publishing the camera image 310. Examples of such operations being applied to a camera image 310-1 or to a group of camera images 310 (e.g., a session 320) are described further below.

With live camera sensor view 410 and image manager pane displayed together in GUI 230, a user may view, manage, and operate on camera image 310-1 from the image manager pane 420 while also being able to view the live camera sensor view 410. That is, the live camera sensor view 410 does not have to be closed from view in order for a user to view, manage, or operate on captured camera image 310-1.

In certain examples, another camera image 310-2 may be captured from the user interface view illustrated in FIG. 4B. For example, while the view shown in FIG. 4B is displayed in GUI 230, a user of mobile device 200 may actuate selector button 210-7 or other input mechanism, and camera facility 150 may responsively capture another camera image 310-2 representative of the live camera sensor view 410.

Figure 4C:
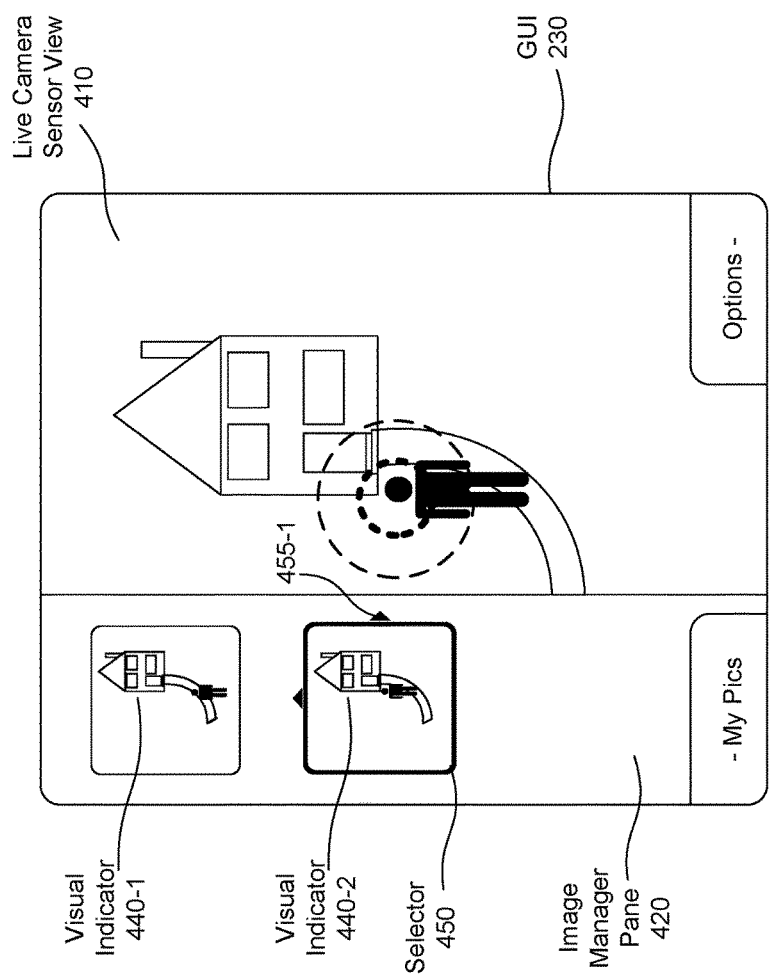

When the other camera image 310-2 is captured, the view shown in FIG. 4B may be updated. For example, FIG. 4C illustrates GUI 230 having visual indicators 440-1 and 440-2 (collectively "visual indicators 440") included in the image manager pane 420. Visual indicator 440-2 may be added to the image manager pane 420 and may represent the newly captured camera image 310-2.

In FIG. 4C, selector 450 is positioned at visual indicator 440-2. In certain embodiments, user interface facility 170 may be configured to automatically position selector 450 at the most recently added visual indicator 440-2 in image manager pane 420. In the present example, for instance, selector 450 is repositioned from visual indicator 440-1 in FIG. 4B to visual indicator in FIG. 4C when camera image 310-2 is captured and visual indicator 440-2 added to image manager pane 420.

Selector 450 may be navigated within the image manager pane 420 in accordance with user input. For example, actuation of an "up" directional button 210-8 may cause selector 450 to move from visual indicator 440-2 to visual indicator 440-1 in FIG. 4C. Accordingly, a user may navigate selector 450 within image manager pane 420 and select and initiate operation on any camera image 310 associated with a visual indicator 440 included in the image manager pane 420.

In certain embodiments, when live camera sensor view 410 and image manager pane 420 are displayed together in GUI 230, certain inputs may be defined as being associated with either live camera sensor view 410 or image manager pane 420. For example, when the view shown in FIG. 4C is displayed in GUI 230, actuation of a certain one of the input buttons 210 of mobile device 200 may be configured to initiate capture of a camera image 310, while actuation of one or more of the other input buttons 210 of mobile device 200 may be configured to initiate navigating between and selecting visual indicators 440 included in the image manager pane 420. Accordingly, the live camera sensor view 410 and the image manager pane 420 may be concurrently active for receiving certain user input and performing corresponding operations.

In other embodiments, user interface facility 170 may be configured to toggle an active input mode between the live camera sensor view 410 and the image manager pane 420 in response to user input. When the live camera sensor view 410 or the image manager pane 420 is in active input mode, user input may be received for the particular view 410 or pane 420. As an example of toggling input mode, when input mode is active in image manager pane 420, receipt of predetermined user input may cause input mode to become inactive for image manager pane 420 and active for the live camera sensor view 410. In certain examples, the "right" directional input button 210-8 may be associated with switching active input mode from the image manager pane 420 to the live camera sensor view 410. A visual indication of a toggle active input mode command may be displayed in GUI 230. FIGS. 4B and 4C each illustrate a visual "right" directional arrow indicator 455-1 positioned adjacent to selector 450 and pointing in the direction of the live camera sensor view 410. This may indicate that actuation of the "right" directional input button 210-8 may be configured to cause active input mode to switch from the image manager pane 420 to the live camera sensor view 410. Similarly, another predetermined input, such as the "left direction input button 210-8, for example, may be configured to cause active input mode to switch from the live camera sensor view 410 to the image manager pane 420.

In certain embodiments, image manager pane 420 may be session specific. That is, visual indicators 440 in image manager pane 420 may be associated with camera images 310 corresponding to a particular session 320. As an example, when a camera image 310-2 is captured and assigned to a session 320-1, user interface facility 170 may be configured to include in image manager pane 420 content associated with the same session 320-1. For example, visual indicators 440-1 and 440-2 may be included in image manager pane 420 at least because the respectively corresponding camera images 310-1 and 310-2 are associated with the same session 320-1. A session 320-1 to which the most recently acquired camera images are assigned may be referred to as an "active session," and the image manager pane 420 may be configured to include visual indicators 440 of the camera images associated with an active session.

An image manager pane 420 having session specific content may help reduce the chance for confusion and/or error as compared to conventional camera interfaces that are not session specific. For example, when camera images 310-1 and 310-2 are captured and assigned to a session 320-1 and visual indicators 440-1 and 440-2 associated with captured camera images 310-1 and 310-2 are displayed in the image manager pane 420, the user may be able to manage the camera images 320-1 and 320-2 in the session 320-1 individually or as a group without having to consider other camera images not associated with the session 320-1. For instance, without having to view and/or sort through other camera images not included in the session 320-1, a user may scroll through visual indicators 440-1 and 440-2 in the image manager pane 420 and initiate performance of operations on at least one of the corresponding camera images 310-1 and 310-2, such as deleting an unwanted camera image (e.g., camera image 310-2) from the session 320-1 before permanently saving the remaining camera image (e.g., camera image 310-1) in storage facility 130.

Figure 4D:
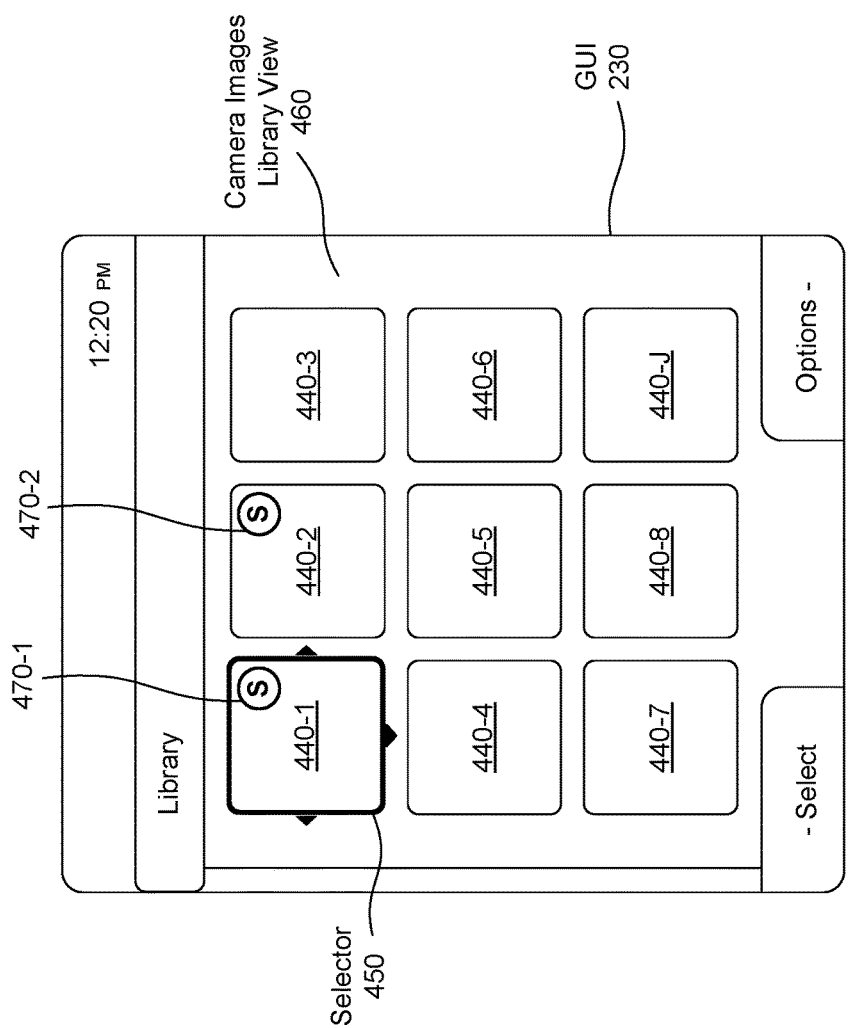

User interface facility 170 may be configured to provide other session-specific views and/or session indicators associated with camera images 310. As an example, FIG. 4D illustrates an exemplary camera images library view 460 in GUI 230. As shown, the library view 460 may include a plurality of visual indicators 440-1 through 440-J, each of which may correspond with a camera image 310. GUI 230 may further include session indicators 470-1 through 470-2 (collectively "session indicators 470") configured to indicate that particular visual indicators 440-1 through 440-2 and/or corresponding camera images (e.g., camera images 310-1 and 310-2) are associated with a common session 320-1.

Accordingly, a user may discern from a GUI view which camera images 310-1 and 310-2 are associated with a particular session 320-1. While FIG. 4D illustrates exemplary session indicators 470, other session indicators or types of session indicators may be used in other embodiments. For example, similar colors, backgrounds, borders, brightness, or opacity may be used to indicate association with a common session 320-1.

User interface facility 170 may be configured to provide a user with a capability to select multiple visual indicators 440 from those included in image manager pane 420 or library view 460. For example, selector 450 may be used to navigate and select one or more visual indicators 440-1 and 440-4 to create a group of selected camera images (camera images 310-1 and 310-4 associated with visual indicators 440-1 and 440-4).

In certain embodiments, user interface facility 170 may be configured to enable a user to navigate to and select a particular visual indicator 440-1 or corresponding camera image 310-1 associated with a session 320-1, and from the selected visual indicator 440-1 or camera image 310-1, choose to select all other camera images (e.g., camera image 310-2 corresponding with visual indicator 440-2) that are associated with the same session 320-1. As an example, with visual indicator 440-1 highlighted by selector 450 as shown in FIG. 4D, a user may select an "options" input button (e.g., "soft" input button 210-2) to launch a window in GUI 230 including selectable operations that may be performed in relation to the camera image 310-1 associated with visual indicator 440-1.

Figure 4E:
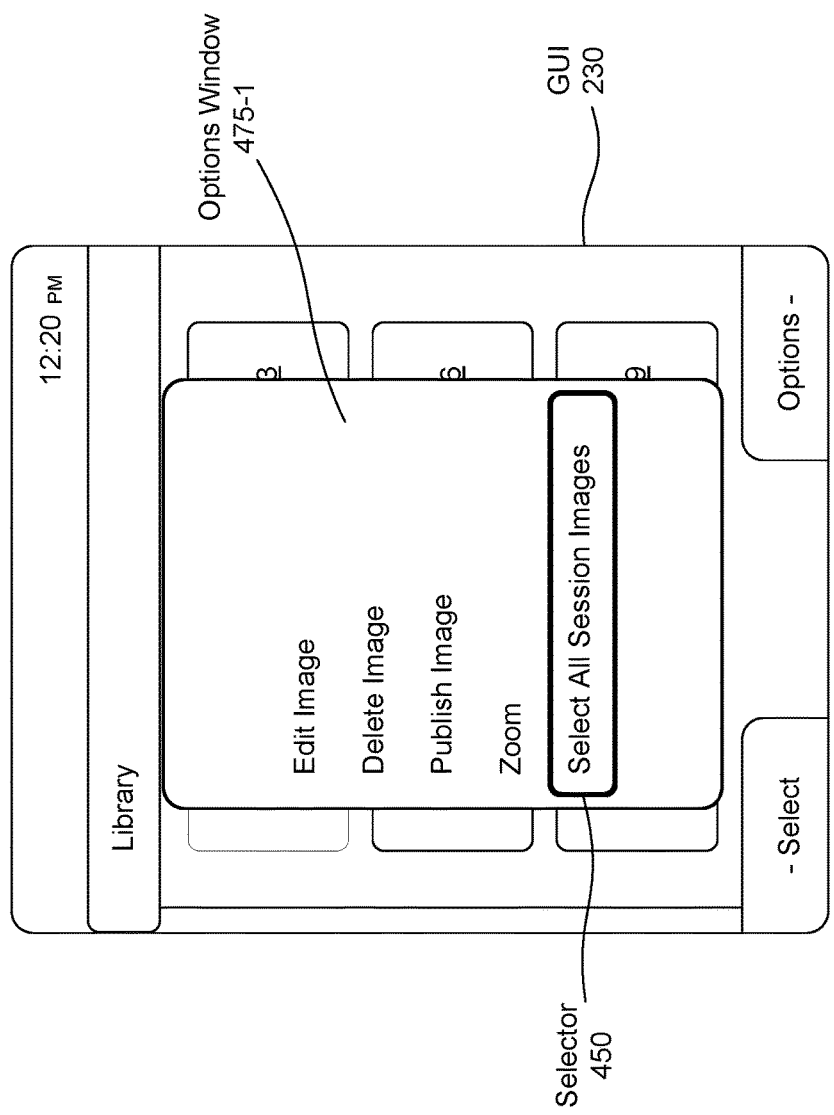

FIG. 4E illustrates an exemplary options window 475-1 displayed in GUI 230. Options window 475-1 may include one or more selectable options associated with one or more operations that may be applied to the selected visual indicator 440-1 and/or corresponding camera image 310-1. Examples of such options and/or operations may include deleting, editing, zooming in on, and publishing the selected camera image 310-1. As shown, one of the selectable options in options window 475-1 may correspond with an operation for identifying and selecting all camera images associated with the same session 320-1 as the selected camera image 310-1. When this option is selected, all camera images 310 associated with session 320-1 are selected for inclusion in a selected group.

The selected group may be indicated in GUI 230. FIG. 4F illustrates library view 460 with multiple visual indicators 440-1 and 440-2 visually marked to represent inclusion of the corresponding camera images 310-1 and 310-2 in a user-selected group. In the illustrated example, group indicators comprise checkmark graphics associated with visual indicators 440-1 and 440-2. This is illustrative only. Other group indicators may be used in other embodiments.

Figure 4G:
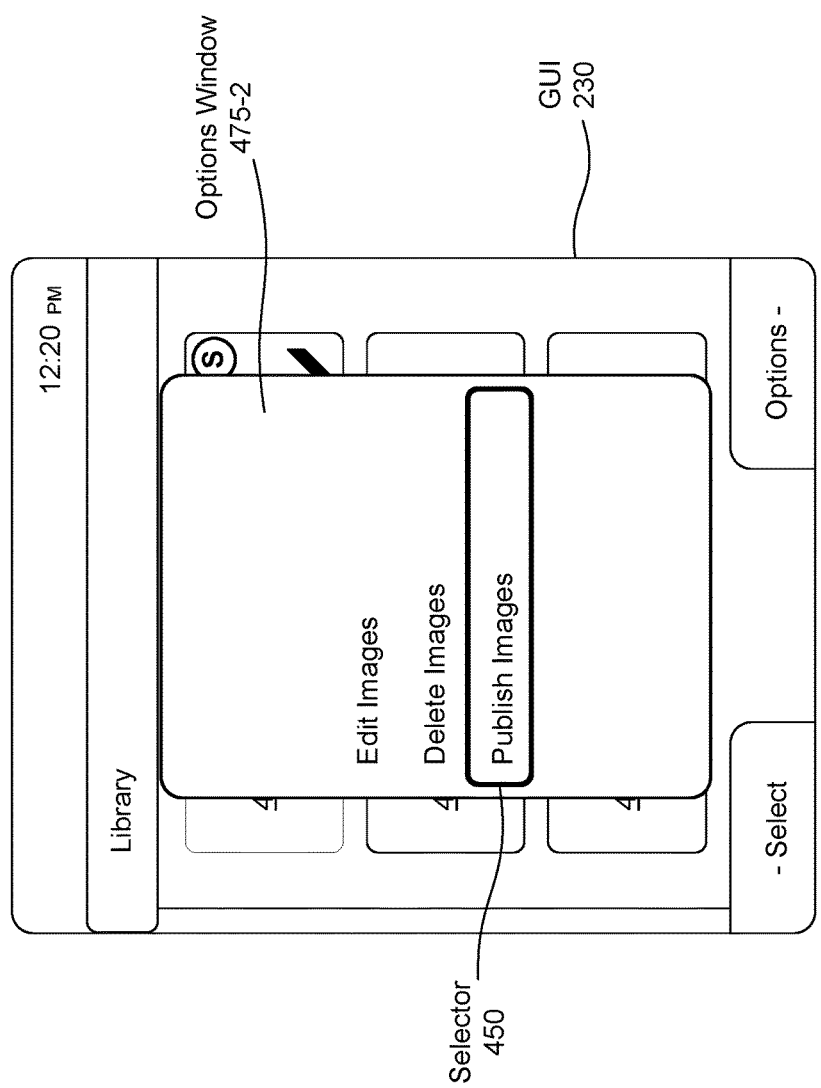

Camera images 310-1 and 310-2 selected for inclusion in a group may be operated on as a group. With a group of camera images 310-1 and 310-2 selected as shown in FIG. 4F, for example, a user may select an "options" input (e.g., "soft" input button 210-2) to launch another options window 475-2 in GUI 230 including selectable operations that may be applied to the selected group of camera images 310-1 and 310-2. FIG. 4G illustrates another options window 475-2 including selectable operations for editing, deleting, and published camera images 310-1 and 310-2 as a group. If one of the selectable options in options window 475-2 is selected, one or more operation(s) associated with the selected option will be applied to the selected group of camera images 310. As an example, camera images 310-1 and 310-2 included in a selected group may be published concurrently when a user selects a "publishing" option from the options window 475-2 shown in FIG. 4G.

While any of a number of operations may be applied to a selected camera image 310 or selected group of camera images 310, examples of publishing one or more selected camera mages 310 will now be described. Publication of a camera image 310 or group of camera images 310 may include, but is not limited to, sending one or more camera images 310 to another device (e.g., another mobile phone), to a contact in a contacts database, to an external service or site (e.g., a social networking site), to a distribution server, to storage facility 130, to an external data storage facility, to I/O facility 140 for display, and to any other facility of or interface to system 100.

As an example, a user may wish to send a selected group of camera images 310-1 and 310-2 to a person included in a contacts database. In the view shown in FIG. 4G, the user may select the "Publish Images" option from the options window 475-2. In response to this selection, another options window 475-3 may be displayed in GUI 230, such as is illustrated in FIG. 4H. Options window 475-3 may include selectable options for publishing the selected camera images 310-1 and 310-2. In the example shown in FIG. 4H, the selectable options include options for publishing the selected camera images 310-1 and 310-2 to a social network site, to a web location (e.g., a particular website), to one or more contacts, to a locally defined distribution list (e.g., a predefined group of contacts), and to an distribution service labeled "Express." Examples of publishing to an exemplary distribution service are described further below.

Figure 4I:
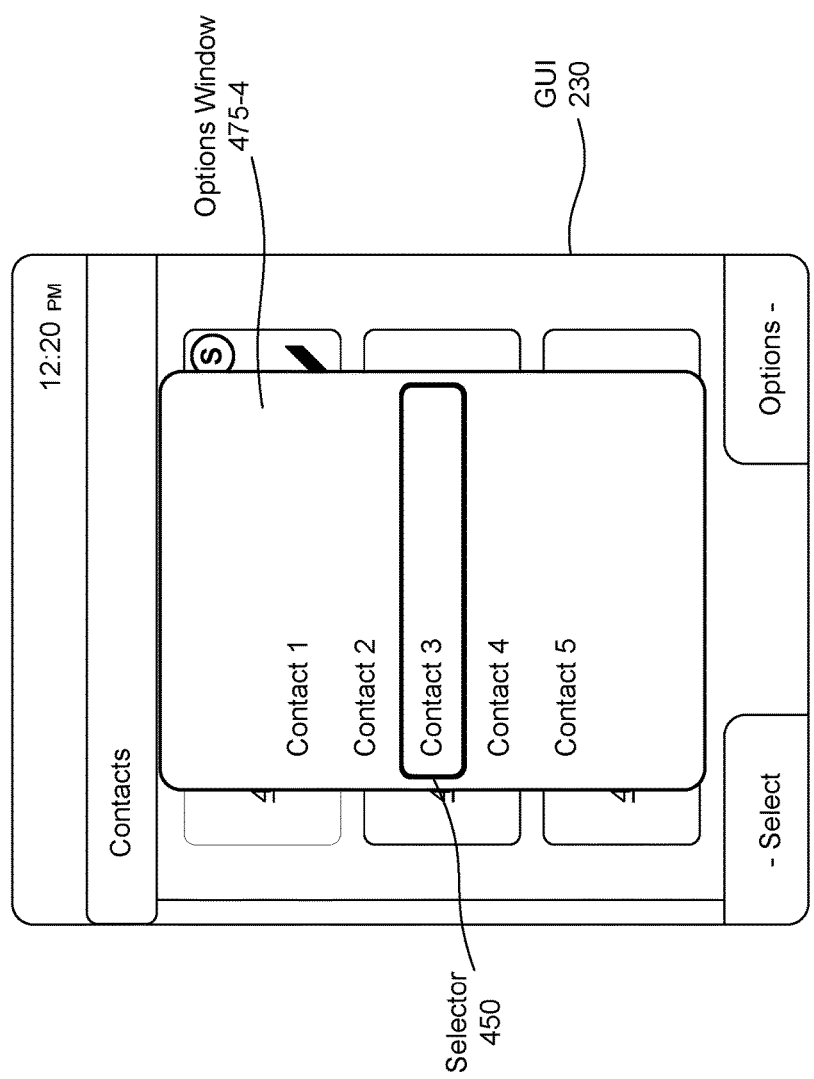

If the user selects the "Contacts" option from the list of options in options window 475-3, user interface facility 170 may display another options window 475-4 in GUI 230, such as is illustrated in FIG. 4I. As shown in FIG. 4I, options window 475-4 may include one or more selectable options corresponding with predefined contacts, which may be accessed from a contacts database stored in storage facility 130. A user may select one of the contacts listed in options window 475-4. In response, publishing facility 180 may initiate transmission of data representative of the selected camera images 310-1 and 310-2 to one or more communication devices associated with the selected contact in the contacts database. For example, the data may be transmitted to a mobile phone, e-mail address, and/or other destination specified in the contacts database.

Sending camera images 310 to a selected contact is just one example of publishing camera images 310. As mentioned above, publishing may include providing data representative of camera images 310 to other destinations such as a website and/or a social networking site (e.g., a user's page on a social networking site).

Figure 5:
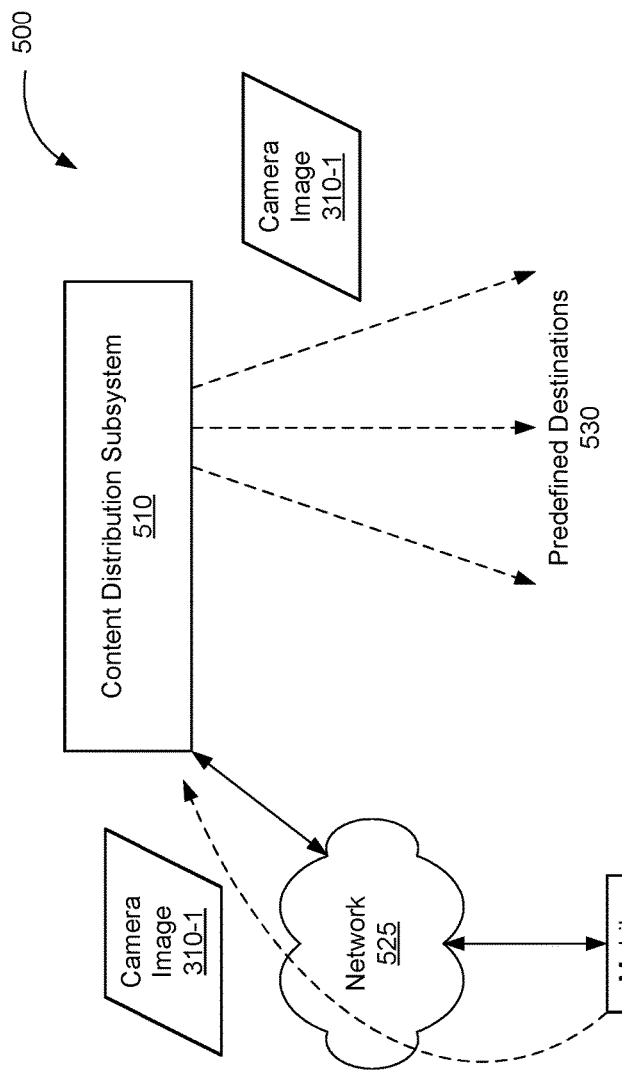
FIG. 5 illustrates an exemplary publishing system.

Another example of publishing camera images 310 includes sending a camera image or selected group of camera images to a distribution service for distribution of the camera image or selected group of camera images by the service to one or more predefined destinations. FIG. 5 illustrates an exemplary publishing system 500 (or simply "system 500") in which mobile device 200 may provide (e.g., upload) one or more camera images 310 to a content distribution subsystem 510 over a network 525. Content distribution subsystem 510 may be configured to distribute the camera images 310 to one or more predefined destinations 530. FIG. 5 shows a single camera image 310-1 being uploaded from mobile device 200 to content distribution subsystem 510 and distributed from content distribution subsystem 510 to a plurality of predefined destinations 530.

Mobile device 200 and content distribution subsystem 510 may communicate over network 525 using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications networks and technologies.

Network 525 may include one or more networks, including, but not limited to, wireless networks, mobile telephone networks (e.g., cellular telephone networks), closed media networks, open media networks, closed communication networks, open communication networks, satellite networks, navigation networks, broadband networks, narrowband networks, voice communications networks (e.g., VoIP networks), the Internet, wide area networks, local area networks, public networks, private networks, and any other networks capable of carrying data and/or communications signals between mobile device 200 and content distribution subsystem 510. In certain exemplary embodiments, network 525 includes a mobile telephone network, and content distribution subsystem 510 and mobile device 200 are configured to communicate with one another using mobile phone network communication technologies.

In some examples, system 500 may include any computing hardware and/or instructions (e.g., software programs), or combinations of computing instructions and hardware, configured to perform the processes described herein. In particular, it should be understood that components of system 500 may be implemented on one physical computing device or may be implemented on more than one physical computing device. Accordingly, system 500 may include any one of a number of computing devices and/or computer operating systems (e.g., mobile device operating systems).

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media, including any computer-readable medium described above.

Predefined destinations 530 may include any device, service, or other destination configured to receive camera images 310 distributed by content distribution subsystem 510. Examples of predefined destinations, include, but are not limited to, another device associated with a user of mobile device 200 (e.g., a personal computer or television service set-top box), another mobile device 200 associated with the user or another user (e.g., another mobile phone), a server device associated with a service (e.g., a social networking site server), a data storage device and/or service, and any other destination configured to receive distributed data representative of camera images 310.

Any suitable communications technologies may be used to distribute camera images 310 from content distribution subsystem 510 to one or more predefined destinations 530, including any of the communications devices, protocols, formats, networks, and technologies described above. Content distribution subsystem 510 may be configured to distribute camera images 310 over the same network 525 used for communications with mobile device 200 ("in network") and/or over communication channels controlled by a common franchise ("in franchise"). Alternatively or additionally, content distribution subsystem 510 may be configured to distribute camera images 310 over communications channels other than those used for communications with mobile device 200 ("out of network") and/or communication channels other than those controlled by a common franchise ("out of franchise").

Distribution of camera images 310 by content distribution subsystem 510 may allow a user of mobile device 200 to minimize or avoid fees that may normally be charged for sending data representative of camera images 310. For example, certain conventional mobile phone services may be structured to charge a fee for each such communication sent from mobile device 200. Accordingly, if a user of mobile device 200 sent camera images 310 directly from the mobile device 200 to multiple predefined destinations 530, a fee may be incurred for each separate communication. Alternatively, the user of the mobile device 200 may send the camera images 310 to content distribution subsystem 510 and incur only a fee for this transmission. The content distribution subsystem 510 may distribute the camera images 310 to multiple predefined destinations 530 without the user of the mobile device 200 incurring additional fees for the distribution.

Figure 6:
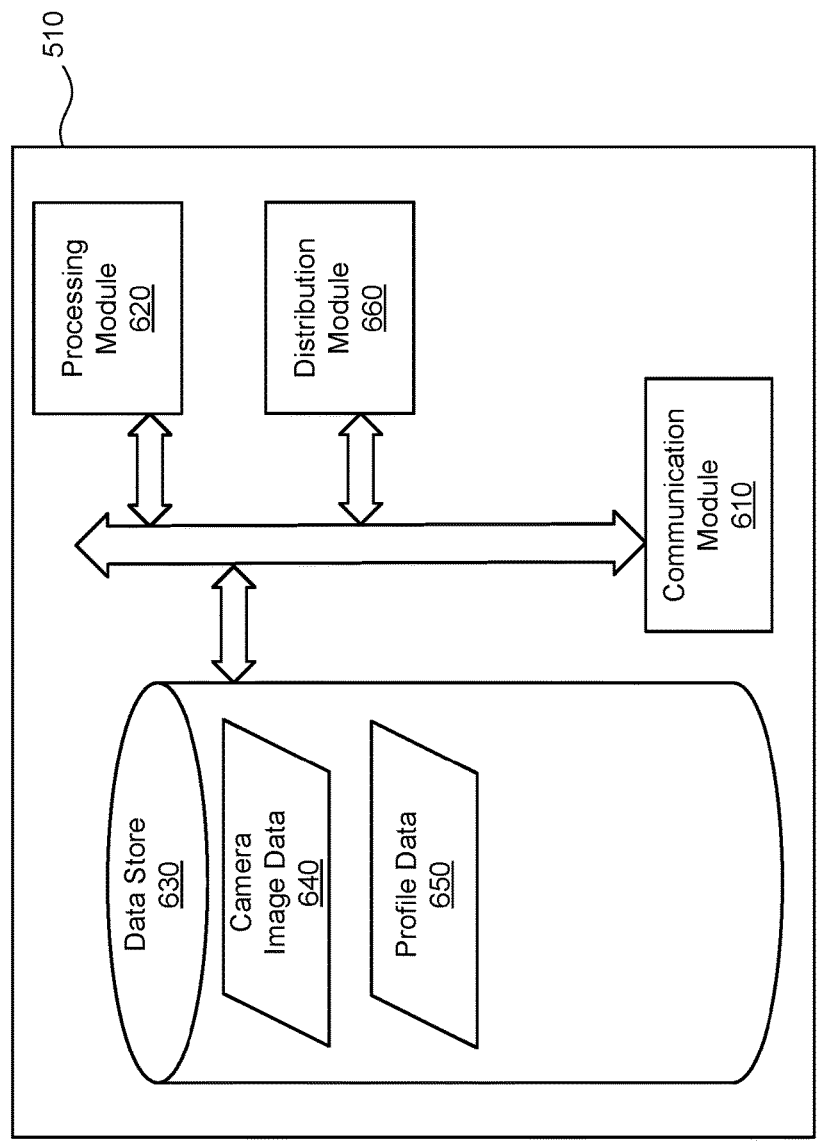
FIG. 6 illustrates an exemplary content distribution subsystem.

Content distribution subsystem 510 may comprise one or more devices (e.g., one or more servers) configured to receive and distribute data representative of camera images 310 using one or more communication technologies. FIG. 6 illustrates an exemplary content distribution subsystem 510. The components of content distribution subsystem 510 may include or be implemented as hardware, computing instructions (e.g., software) embodied on one or more computer-readable media, or a combination thereof. In certain embodiments, for example, one or more components of content distribution subsystem 510 may include or be implemented on at least one server configured to communicate over network 525. While an exemplary content distribution subsystem 510 is shown in FIG. 6, the exemplary components illustrated in FIG. 6 are not intended to be limiting. Indeed, additional or alternative components and/or implementations may be used.

As shown in FIG. 6, content distribution subsystem 510 may include a communication module 610, which may be configured to communicate with mobile device 200, including receiving data representative of camera images 310 from mobile device 200 and providing data representative of camera images 310 to one or more predefined destinations 530. Communication module 610 may be configured to support a variety of communication platforms, protocols, and formats such that content distribution subsystem 510 can receive content from and distribute content to a variety of computing platforms (e.g., a mobile telephone service platform, a web-based platform, a subscriber television platform, etc.) and using a variety of communications technologies. Accordingly, the content distribution subsystem 510 can support a multi-platform system in which content can be received from and provided to diverse platforms.

Content distribution subsystem 510 may include a processing module 620 configured to control operations of components of the content distribution subsystem 510. Processing module 620 may execute or direct execution of operations in accordance with computer-executable instructions stored to a computer-readable medium such as a data store 630. As an example, processing module 620 may be configured to process (e.g., encode, decode, modulate, and/or demodulate) data and communications received from or to be transmitted to mobile device 200 and/or predefined destinations 530. As another example, processing module 620 may be configured to perform data management operations on data stored in data store 630. For example, processing module 620 may operate on data, including storing data to data store 630 and indexing, searching, accessing, retrieving, modifying, annotating, copying, and/or deleting data stored in data store 630.

Data store 630 may include one or more data storage media, devices, or configurations and may employ any type, form, and combination of storage media. For example, the data store 630 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data store 630 may store any suitable type or form of electronic data, including camera image data 640 and profile data 650.

Camera image data 640 may include data representative of one or more camera images 310, including camera images 310 received from mobile device 200 over network 525. Camera image data 640 may further include data related to camera images 310, including camera image metadata, for example.

Profile data 650 may include information associated with one or more users, which may include subscribers to one or more services provided over network 525, such as a user of mobile device 200. Profile data 650 may include any information descriptive of the users, user preferences, user-specific settings, and/or services provided to the users. In certain embodiments, profile data 650 may include predefined distribution settings associated with users. The predefined distribution settings may be used to identify one or more destinations to which camera images 310 will be distributed, as described further below.

Distribution settings for a user may be custom defined by the user. Content distribution subsystem 510 and/or mobile device 200 may be configured to provide one or more tools for custom definition of distribution settings. The tools may be provided in any suitable way and may include any mechanisms or processes that a user may utilize to custom define one or more predefined distribution destinations 530. For example, a graphical user interface may be provided and may include one or more tools configured to enable a user to provide distribution information and settings. Accordingly, a user profile may include personalized distribution settings specifying one or more predefined distribution destinations and related information such as addresses, access information (e.g., user name and password), interface information (API access information), and any other information potentially helpful for identifying distribution destinations and distributing camera images 310 thereto. Accordingly, a user profile and predefined distribution settings included therein may be used to automatically distribute data representative of camera images 310 from content distribution subsystem 510 to one or more predefined destinations 530.

As shown in FIG. 6, content distribution subsystem 510 may further include a distribution module 660, which may include or be implemented as hardware, computing instructions (e.g., software) tangibly embodied on a computer-readable medium, or a combination of hardware and embodied computing instructions configured to perform one or more of the content distribution processes described herein. In certain embodiments, distribution module 660 may be implemented as a software application embodied on a computer-readable medium such as data store 630 and configured to direct the processing module 620 to execute one or more of the processes described herein.

Content distribution subsystem 510 may be configured to recognize when one or more camera images 310 received from mobile device 200 are to be distributed based on predefined distribution settings specified in user profile data 650. Content distribution subsystem 510 may identify one or more predefined distribution destinations from the predefined distribution settings and may distribute, or initiate distribution of, the camera images 310 to the predefined destinations 530.

As an example, when a user of mobile device 200 selects the "Express Distribution Service" option from the list of selectable options in options window 475-3 shown in FIG. 4H, mobile device 200 may provide data representative of a selected camera image 310-1 (or selected group of camera images 310 in other examples) to content distribution subsystem 510 over network 525 as illustrated in FIG. 5. Along with the camera image 310-1, mobile device 200 may provide an indication that the camera image 310-1 is provided for distribution in accordance with an express distribution service. Communication module 610 may receive the data, and distribution module 660 may recognize from the data a request for distribution of the camera image 310-1 in accordance with the express distribution service. Distribution module 660 may access an appropriate profile in the profile data 650, such as a profile associated with the user of mobile device 200 from which the camera image 310-1 is received. Distribution module 660 may use predefined distribution settings specified in the identified profile to determine one or more predefined destinations 530 to which camera image 310-1 will be sent. Using information included in the distribution settings, distribution module 660 may initiate distribution of camera image 310-1 to the identified predefined destinations 530. The camera image 310-1 may be automatically distributed to the predefined destinations 530 in accordance with the predefined distribution settings and without human intervention. In this or similar manner, a user may upload one or more camera images 310 from mobile device 200 to content distribution subsystem 510 for automatic distribution from the content distribution subsystem 510 to one or more predefined destinations 530. Accordingly, acquired camera images 310 may be managed including by being uploaded and automatically sent to predefined destinations 530 such as a blog, a data backup storage facility, and/or a social networking site.

User interface facility 170 may be configured to provide visual animation effects in GUI 230 in association with one or more of the GUI views and/or one or more of the operations described above. For example, animation effects may be displayed and may be representative of transfer, capture, and/or publishing of camera images 310. In certain embodiments, animation effects may be displayed concurrently with performance of data transfer, capture, and/or publishing operations. Animation effects may help improve a user experience during memory access delay periods.

As an example of animation effects, when the GUI view shown in FIG. 4B is displayed and a user captures a camera image 310-2, user interface facility 170 may provide animation effects designed to animate a capture of the camera image 310-2 and/or a data transfer of the camera image 310-2 from live camera sensor view 410 to image manager pane 420. In certain embodiments, the animation effects may be designed to illustrate a funnel flow of camera image pixels, such as from the live camera sensor view 410 to visual indicator 440-2 in the image manager pane 420. In other embodiments, the animation effects may be designed to illustrate a spiral flow and/or compression of camera image pixels, such as from the live camera sensor view 410 to visual indicator 440-2 in the image manager pane 420. Such animation effects may provide a visual appearance of pixels being sucked into visual indicator 440-2 from the live camera sensor view 410. These examples are illustrative only and may be used in other GUI views, including visually indicator capture and storage of a camera image 310-2 to library view 460. Other animation effects may be used in other embodiments.

As another example, animation effects may be provided and configured to animate publishing of camera images 310. For example, animation effects may illustrate an expansion of pixels and/or a flow of pixels from a visual indicator 440-2 to a publishing destination 530 such as to a display of a full screen view of a camera image 310-2 and/or transport of pixels to an external destination such as a social networking site.

Figure 7:
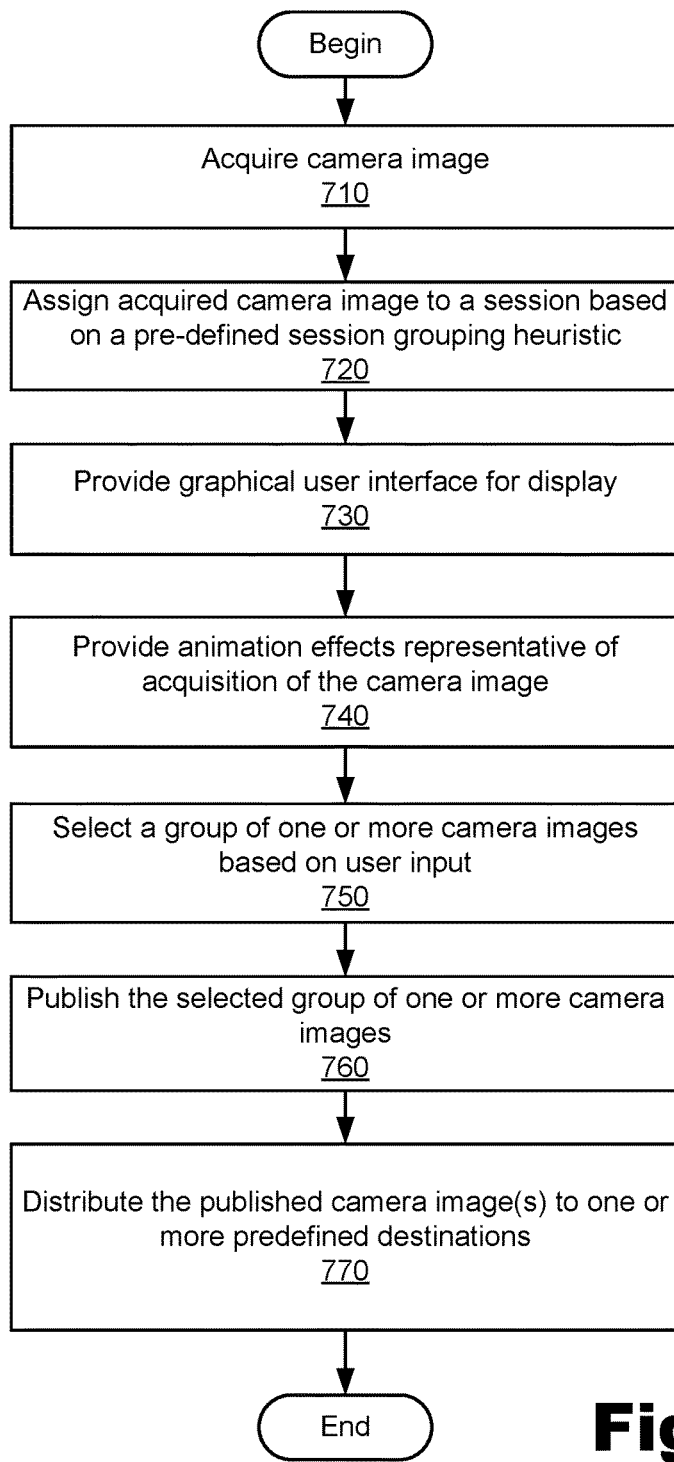
FIG. 7 illustrates an exemplary camera data management and user interface method.

FIG. 7 illustrates an exemplary camera data management and user interface method. While FIG. 7 illustrates exemplary steps according to one embodiment, other embodiments may omit, add to, reorder, and/or modify any of the steps shown in FIG. 7.

In step 710, a camera image is acquired. Step 710 may be performed in any of the ways described above, including camera facility 150 capturing the camera image.

In step 720, the acquired camera image is assigned to at least one session based on a predefined session grouping heuristic. Step 720 may be performed in any of the ways described above, including using one or more criteria in the predefined session grouping heuristic 330 to determine that the camera image qualifies for assignment to the session. Step 720 may be performed automatically.

In step 730, a graphical user interface is provided for display. Step 730 may be performed in any of the ways described above, including user interface facility 170 generating and providing graphical user interface 230 to I/O facility 140, which may display the graphical user interface 230 for viewing by a user.

As described above, various graphical user interface views may be displayed in graphical user interface 230, including any of the exemplary graphical user interface views described above and/or illustrated in the accompanying drawings. User input may be received and user output may be provided by way of the graphical user interface views, as described above. As an example, in step 740, animation effects representative of acquisition of the camera image may be provided in graphical user interface in any of the ways described above.

In step 750, a group of one or more camera images may be identified based on user input. Step 750 may be performed in any of the ways described above, including a user navigating and selecting one or more visual indicators representative of the one or more camera images in graphical user interface 230. From the user selections, user interface facility 170 may identify the group of one or more selected camera images.

In step 760, the group of one or more selected camera images is published. Step 760 may be performed in any of the ways described above, including recognizing a publishing command provided by a user (e.g., by selecting a "publishing" option in graphical user interface 230) and providing data representative of the one or more selected camera images. In certain embodiments, publishing may include sending data representative of the one or more selected camera images to content distribution subsystem 510 over network 525.

In step 770, data representative of the one or more selected camera images is distributed to one or more predefined destinations. Step 770 may be performed in any of the ways described above, including content distribution subsystem 510 receiving data representative of the one or more camera images and automatically distributing data representative of the one or more camera images to one or more predefined destinations. In certain embodiments, the camera images are distributed to the predefined destinations in accordance with distribution settings included in a profile (e.g., a user profile).

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    capturing, by a mobile device having a digital camera, a plurality of camera images;
    locally storing, by the mobile device, the plurality of camera images;
    automatically assigning, by the mobile device, a camera image included in the plurality of camera images to a session based on the camera image being captured during a particular time range; and
    providing, by the mobile device for display on a display screen of the mobile device, a session specific image manager pane together with a live camera sensor view in a graphical user interface, the session specific image manager pane including data representative of the camera image assigned to the session.

2. The method of claim 1, further comprising:
    providing, by the mobile device for display in the session specific image manager pane, a user-navigable selector; and
    automatically positioning, by the mobile device, the user-navigable selector to highlight the data representative of the camera image assigned to the session.

3. The method of claim 1, further comprising:
    automatically assigning, by the mobile device, an additional camera image included in the plurality of camera images to the session based on the additional camera image being captured during the particular time range; and updating, by the mobile device, the session specific image manager pane to also include data representative of the additional camera image assigned to the session.

4. The method of claim 1, further comprising:
providing, by the mobile device for display in the session specific image manager pane, a user-navigable selector;
automatically positioning, by the mobile device, the user-navigable selector to highlight the data representative of the camera image assigned to the session;
automatically assigning, by the mobile device while the user-navigable selector is positioned to highlight the data representative of the camera image assigned to the session, an additional camera image included in the plurality of camera images to the session based on the additional camera image being captured during the particular time range;
updating, by the mobile device, the session specific image manager pane to also include data representative of the additional camera image assigned to the session; and
automatically repositioning, by the mobile device, the user-navigable selector to highlight the data representative of the additional camera image assigned to the session.

5. The method of claim 1, further comprising:
detecting, by the mobile device, an expiration of a predetermined length of time after capture of the camera image assigned to the session; and
hiding, by the mobile device, the session specific image manager pane from view on the display screen in response to the expiration of the predetermined length of time after capture of the camera image assigned to the session.

6. The method of claim 5, wherein the hiding of the session specific image manager pane from view on the display screen causes the live camera sensor view to be displayed full screen in the graphical user interface.

7. The method of claim 1, further comprising providing, by the mobile device for display on the display screen of the mobile device, an options window in the graphical user interface, the options window including a plurality of selectable options for the camera image assigned to the session.

8. The method of claim 7, wherein the plurality of selectable options included in the options window comprises at least one of:
an option to edit the camera image assigned to the session;
an option to delete the camera image assigned to the session; and
an option to publish the camera image assigned to the session.

9. The method of claim 7, wherein the plurality of selectable options included in the options window comprises at least one of:
an option to publish the camera image assigned to the session to a distribution service;
an option to publish the camera image assigned to the session to a social network site;
an option to publish the camera image assigned to the session to one or more contacts of a user of the mobile device;
an option to publish the camera image assigned to the session to a web location; and
an option to publish the camera image assigned to the session to a locally defined distribution list.

10. The method of claim 1, embodied as computer-executable instructions on at least one non-transitory computer-readable medium.

11. A method comprising:
capturing, by a mobile device having a built-in digital camera, a plurality of camera images;
locally storing, by the mobile device, the plurality of camera images;
automatically assigning, by the mobile device, the plurality of camera images to a session based on the plurality of camera images being captured during a particular time range; and
providing, by the mobile device for display on a display screen of the mobile device, a session specific image manager pane together with a live camera sensor view in a graphical user interface, the session specific image manager pane including data representative of the plurality of camera images assigned to the session.

12. The method of claim 11, embodied as computer-executable instructions on at least one non-transitory computer-readable medium.

13. A mobile computing device comprising:
a processor;
a display screen;
a digital camera; and
a non-transitory computer-readable medium storing instructions executable by the processor to direct the mobile computing device to:
capture a camera image with the digital camera;
locally store the camera image;
automatically assign the camera image to a session based on the camera image being captured during a particular time range; and
provide, for display on the display screen, a session specific image manager pane together with a live camera sensor view in a graphical user interface, the session specific image manager pane including data representative of the camera image assigned to the session.

14. The mobile computing device of claim 13, wherein the non-transitory computer-readable medium further stores instructions executable by the processor to direct the mobile computing device to:
provide, for display in the session specific image manager pane, a user-navigable selector; and
automatically position the user-navigable selector to highlight the data representative of the camera image assigned to the session.

15. The mobile computing device of claim 13, wherein the non-transitory computer-readable medium further stores instructions executable by the processor to direct the mobile computing device to:
capture an additional camera image with the digital camera;
locally store the additional camera image;
automatically assign the additional camera image to the session based on the additional camera image being captured during the particular time range; and
update the session specific image manager pane to also include data representative of the additional camera image assigned to the session.

16. The mobile computing device of claim 13, wherein the non-transitory computer-readable medium further stores instructions executable by the processor to direct the mobile computing device to:
detect an expiration of a predetermined length of time after the capture of the camera image assigned to the session; and
hide the session specific image manager pane from view on the display screen in response to the expiration of the predetermined length of time after the capture of the camera image assigned to the session.

17. The mobile computing device of claim 16, wherein the hiding of the session specific image manager pane from view on the display screen causes the live camera sensor view to be displayed full screen in the graphical user interface.

18. The mobile computing device of claim 13, wherein the non-transitory computer-readable medium further stores instructions executable by the processor to direct the mobile computing device to provide, for display on the display screen of the mobile device, an options window in the graphical user interface, the options window including a plurality of selectable options for the camera image assigned to the session.

19. The mobile computing device of claim 18, wherein the plurality of selectable options included in the options window comprises at least one of:

an option to edit the camera image assigned to the session;
an option to delete the camera image assigned to the session; and
an option to publish the camera image assigned to the session.

20. The mobile computing device of claim 18, wherein the plurality of selectable options included in the options window comprises at least one of:

an option to publish the camera image assigned to the session to a distribution service;
an option to publish the camera image assigned to the session to a social network site;
an option to publish the camera image assigned to the session to one or more contacts of a user of the mobile device;
an option to publish the camera image assigned to the session to a web location; and
an option to publish the camera image assigned to the session to a locally defined distribution list.

* * * * *